United States Patent [19]

Kleinman

[11] Patent Number: 4,848,428
[45] Date of Patent: Jul. 18, 1989

[54] METHODS AND APPARATUS FOR SHAPING WORKPIECES

[76] Inventor: Edward M. Kleinman, 123 Campbell Ave., Havertown, Pa. 19083

[21] Appl. No.: 291,134

[22] Filed: Dec. 28, 1988

[51] Int. Cl.⁴ .............................................. B27M 3/00
[52] U.S. Cl. ................................ 144/372; 144/134 R; 144/137; 144/144 R; 144/350; 269/289 R
[58] Field of Search ........... 144/114 R, 117 R, 117 B, 144/134 R, 134 A, 137, 346, 350, 372; 269/268, 289 R, 270, 303

[56] References Cited

U.S. PATENT DOCUMENTS

| | | | |
|---|---|---|---|
| 635,616 | 7/1900 | Cederberg | 144/117 B |
| 2,936,007 | 5/1960 | Palm | 144/117 B |
| 4,729,804 | 3/1988 | Dillner | 269/289 |

*Primary Examiner*—W. Donald Bray
*Attorney, Agent, or Firm*—Stuart S. Bowie

[57] ABSTRACT

Methods and apparatus for forming, shaping and otherwise milling workpieces, especially compound curved laminated wood workpieces for use as handrails, stringers, furniture and the like.

11 Claims, 3 Drawing Sheets

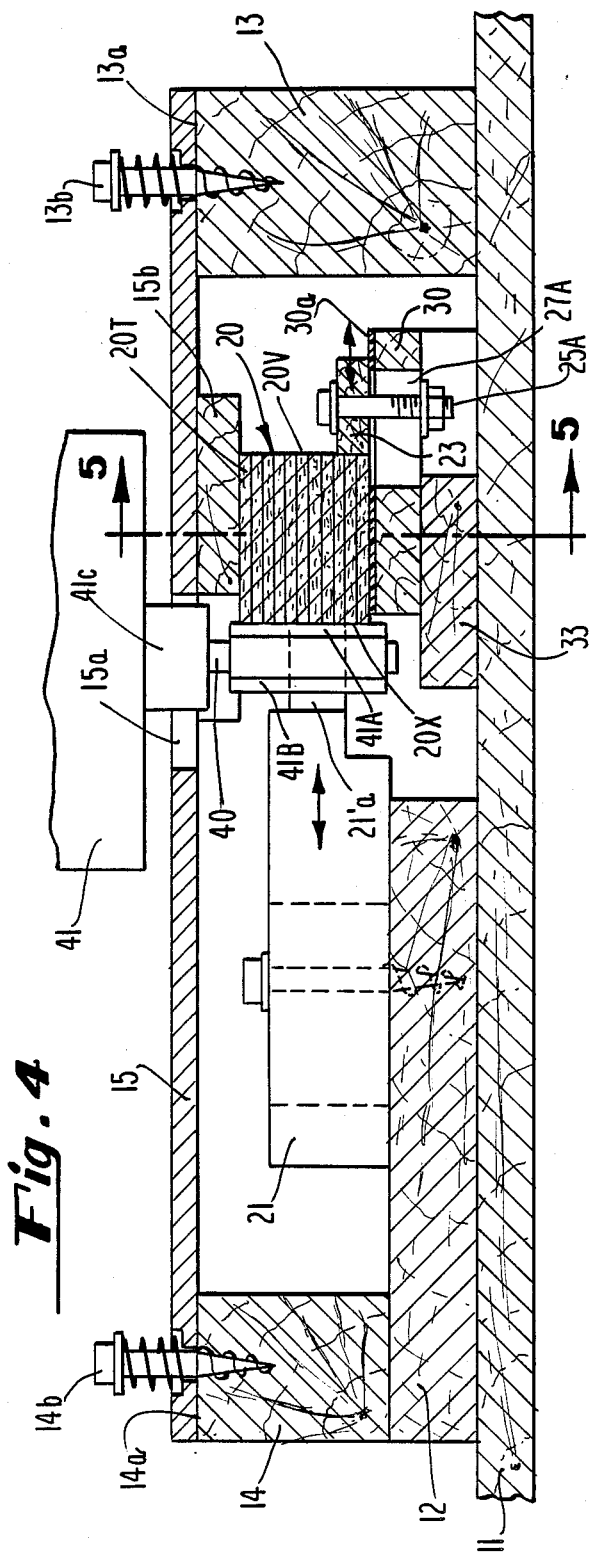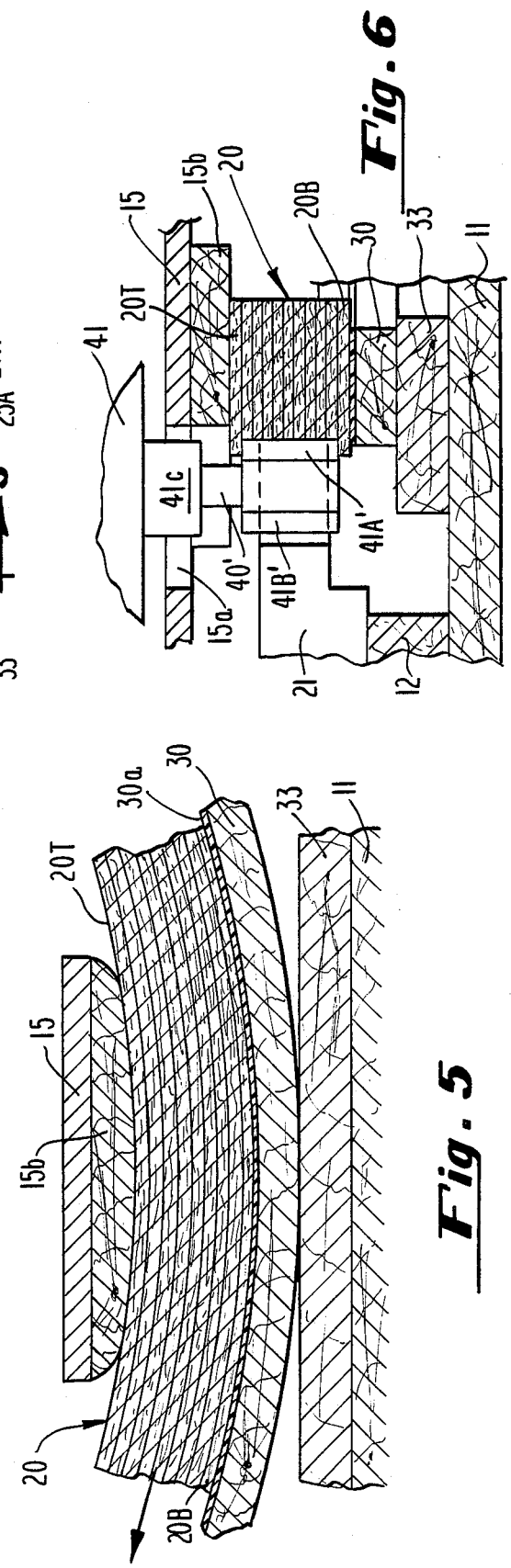

METHODS AND APPARATUS FOR SHAPING WORKPIECES

BACKGROUND

Whether solid or laminated, curved wood articles used for handrails, stringers, furniture parts and the like traditionally have been made by various methods, namely, by cutting, milling and steam bending.

However, the manufacture of compound curved wooden workpieces presents entirely different technical problems than a simple curved workpiece.

Examples of "compound" curved workpieces are handrails for a staircase wherein the handrails extend upwardly in a generally spiral or helical fashion. In this case, it will be appreciated that each handrail as a whole not only "curves" upwardly around a vertical axis, but also that the hand or palm surface also changes its orientation as the handrail curves upwardly in order to present a holding surface for a person going up or down the stairs.

Spiral and helical structures are only two types of shapes that fall within the genus "compound curve". In a broader sense, a compound curve may be explained as follows.

If one imagines a rectangular three dimensional form in space, it can be said that it has a height h, width w and length l. Further, it has a longitudinal axis lx and a vertical axis v which is at 90 degrees to the plane generated by extending the longitudinal axis. That is, the plane generated by extending the lx axis may be considered as extending between 90 degrees and 270 degrees and the plane generated by extending the v axis thus extends from 0 degrees to 90 degrees.

Further, in the above construct, it is postulated that the lx plane is parallel to the top and bottom surfaces of the rectangular structure, and the v plane is parallel to the sides of such structure.

Having this geometric form in mind, a workpiece is placed at the front wall of the rectangle and positioned so that its lengthwise axis is coincident with axis lx and so that its vertical axis is coincident with axis v.

However, as the workpiece is moved into the rectangle, because it has a compound curve, its lengthwise axis lw is non linear. Accordingly, as each finite section enters the rectangle, the lw axis along that portion of the workpiece diverges from axis lx. This divergence may be up or down from either side of lx.

Similarly, the horizontal planar axis hw of workpiece also diverges from the horizontal planar axis hx of the rectangle, i.e., it rotates around plane hx in order to conform to the rotation of the planar axis lw around the axis v, in order to maintain the side walls parallel to the top walls of the workpiece. In other words, axis hw diverges from the v axis.

The above, of course, is susceptible of expression in purely mathematical fashion, but it is thought that the more general verbal description given is advantageous. Moreover, while the foregoing example utilizes a rectangular workpiece, articles having compound curves may be, wholly or partly, oval, circular or have many other cross-sectional shapes. Moreover, the cross-sectional shapes may change from one section of the workpiece to another.

In one important of the embodiment of the invention described herein, the workpiece is a handrail which is rectangular in cross-section from one end to the other.

As the handrail is formed so that its lengthwise and horizontal axes, follow (or generate) a compound curve, it is important for many applications that the rectangular shape be preserved, i.e., at any given cross-section along lw, that the top and bottom surfaces of the handrail be parallel, and that the opposing sides be parallel and at 90 degrees to the top and bottom surfaces.

Thus, in connection with such a handrail, it has a compound curve, i.e., as the vertical axis vw of the handrail changes orientation, its horizontal axis hw also changes in orientation by the same amount to preserve the rectangular shape of the handrail at every cross-section.

To produce a compound curve workpiece, it may be possible to do so by utilizing a highly controlled (e.g., computer controlled) saw or other cutting device, but this technique requires a rigorous layout in the form of a detailed engineering design and a complex computer program. Even if this could be accomplished, it would require a great deal of time. It would also involve starting with a large block of wood and thus there would be extensive waste, which is costly. Conceivably, such a handpiece could also be fashioned by manual cutting, but the operator would have to be highly skilled and it is not realistic to expect that such manual expertise would be consistent enough to produce the same end product—which is what is required not only for mass production, but also for custom applications.

On the other hand compound curve articles are desirable for a variety of applications, including handrails, stringers, furniture parts and other items, and it is important that any system used be repeatable, so that mass production is possible.

While it is possible to form a compound curve article such as a handrail on a forming frame from a solid piece of wood, for purposes of efficiency and to be able to provide highly complex shapes, it is practically necessary to form the workpiece from a plurality of laminates. More specifically, glue is applied to both surfaces of laminate strips and, prior to the setting of the glue, and when the laminates can still move with respect to each other, the entire assembly is clamped about a forming frame in the shape of a compound curve. The glue then dries while the workpiece is held to the frame, so that the compound curve shape of the workpiece is set.

However, while the use of laminates as described has significant advantages, there is always sideways slippage of individual lamina. Consequently, the sides of the workpiece are rough since individual lamina protrude by different amounts.

SUMMARY

An important object of the present invention is to provide methods and apparatus for forming compound curve workpieces, particularly handrails for stairs.

More particularly, an object of this invention is to provide methods and apparatus for forming a compound curve workpiece of laminated wood, wherein the rough and jagged side edges are milled down to produce a smooth surface which is parallel to the opposing surface and at 90 degrees to the top and bottom surface of the workpiece.

Other objects and advantages of the present invention will appear from the following detailed description, the claims and the drawings.

THE DRAWINGS

FIG. 4 is a sectional view along the lines 4—4 of FIG. 1 of the apparatus of the invention showing the placement of the milling device.

FIG. 5 is a sectional view along the lines 5—5 of FIG. 4.

FIG. 6 is a fragmentary sectional view showing an alternative embodiment of the milling device shown in FIG. 4 in position to mill a groove in the side of the workpiece.

DETAILED DESCRIPTION

Figure 1:
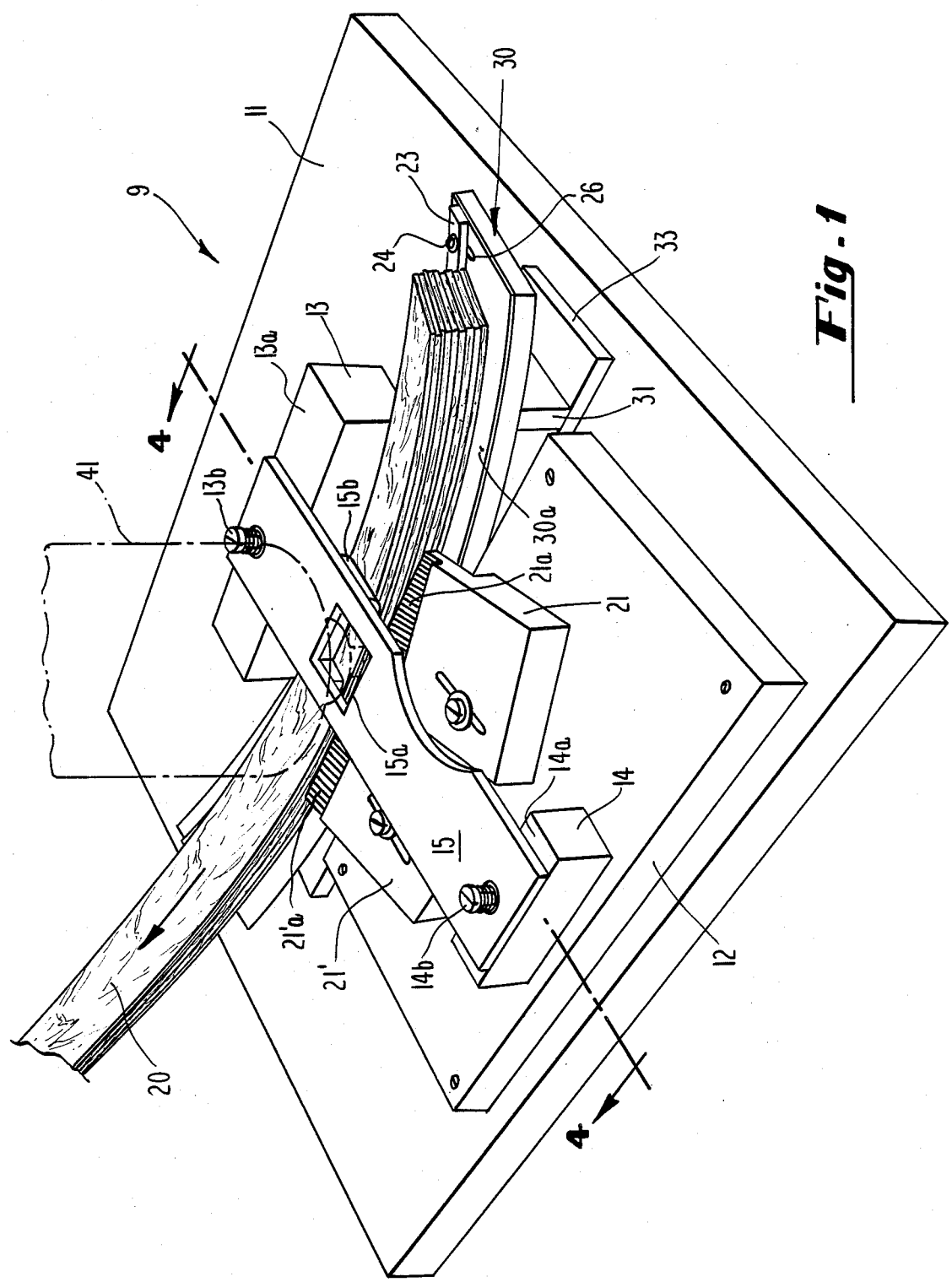
FIG. 1 is a perspective view of one embodiment of the apparatus of this invention.

The apparatus shown in the drawings as one preferred embodiment of the invention is generally designated 9 and has a platform 11 which supports the other components.

Thus, mounted on platform 11 is a elevating deck 12 and, spaced laterally therefrom, there is another elevating deck 13. Deck 12 has mounted on it an elevating block 14 whose upper surface 14a is at the same level as the upper surface 13a of deck 13.

The purpose of providing surfaces 13a and 14a at the same level above platform 11 is that they function as supports for the hold-down means 15. Hold-down means 15 has a block 15b attached to it by any suitable means, such as by screws or adhesive. Block 15b is so configured that its lower surface engages workpiece 20. Block 15b is clearly shown in FIG. 4 and in FIG. 5, which is a sectional view taken along lines 5—5 of FIG. 4.

As the term implies, the purpose of hold-down means 15 is to hold down and physically capture and contain a laminated wood workpiece 20 which already has been formed into a compound curve shape on a forming frame (not shown).

Means 15, which may be of wood or metal, for example, is held-down against workpiece 20, as shown in FIG. 4, by spring-loaded fasteners 13b and 14b, which maintain means 15 in pressing engagement with the top surface of workpiece 20, as shown in FIG. 5 also, so that workpiece 20 is not only held down but so that means may flex upwardly or downwardly as the thickness of workpiece 20 varies, as sometimes occurs.

As the term implies, the purpose of hold-down means 15 is to hold down and physically capture and contain a laminated wood workpiece 20 which already has been formed into a compound curve shape on a forming frame (not shown).

In the present invention, workpiece 20 comprises a plurality of lamina glued together. As set forth above, at the beginning of the forming process, the glue is not set and, accordingly, the laminated structure is bent around the forming frame into the compound curve shape.

Figure 2:
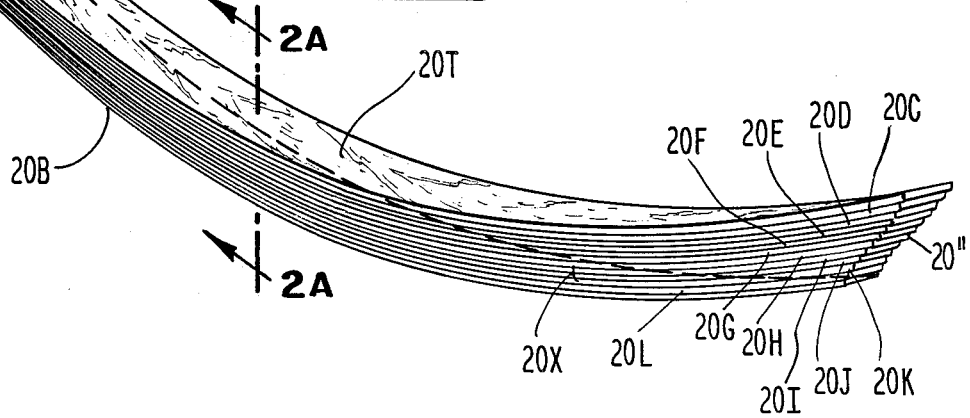
FIG. 2 is a perspective view of a compound curve laminated handrail of the type manufactured by this invention.

However, the bending process results in sideways slippage of the individual lamina. Workpiece 20 is shown in FIG. 2 and has a top surface 20T and a bottom surface 20B. These two lamina are smooth and parallel to each other.

Figure 2A:
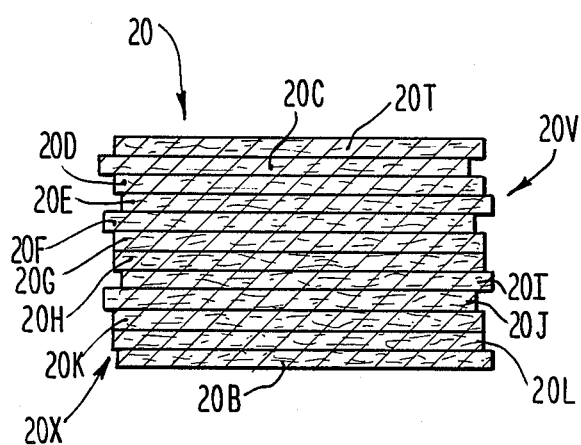
FIG. 2A is a sectional view taken along the lines 2A—2A of FIG. 2.
Figure 2B:
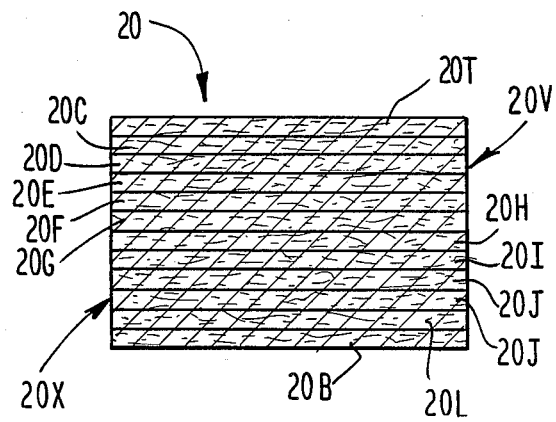
FIG. 2B is a sectional view of the handrail, along the same section as FIG. 2A, after the jagged edges of the laminates have been milled down by the method and apparatus of this invention.

However, as shown in FIG. 2A, the edges of lamina 20C-20L, which are between lamina 20T and 20 B, are not coplanar in the vertical dimension, but are instead offset at different distances from each other, thereby forming a rough or jagged side walls 20X and 20V, which rough surfaces would render the workpiece 20 commercially unacceptable as a handrail. That is, surface 20X is the palm (or hand) surface of the handrail and must be smooth. Thus, the technical problem is how to remove the offset edges and produce sides 20X and 20V which are both smooth and parallel to each other without, in so doing, destroying the perpendicular relationship of the planes 20X and 20V, and also so that the desired width of the workpiece 20 is uniform throughout. This cannot be accomplished economically by sanding, nor can sanding produce the necessary planar and parallel surfaces which are generally required. (In certain applications, it is desirable to produce a grooved or other non-planar surface, e.g., a surface with a groove. This invention also provides apparatus and methodology to accomplish this objective, as is described below.)

Moreover, wholly apart from problems presented by uneven edges of laminar material, in many instances compound curve workpieces are formed of material wider than that desired for the final article. For this reason also, milling down of the sides is necessary. (As used herein, including in the claims, "milling" means the generic process of using a tool to shape an article and such tools include, but are not limited to, cutting devices such as routers.)

Accordingly, it has been discovered that, despite the formidable challenge of dealing with a compound curve workpiece, it is possible to utilize existing milling tools, such as a router, to accomplish the task.

In stating the above, however, it must be emphasized that conventional milling support devices simply cannot be used. That is, such devices are designed and constructed so that they are capable of containing only linear or, at best, non-compound curve workpieces. Each of those types of workpieces have top and bottom surfaces which are flat with respect to the supporting member of the device, which is also flat. Accordingly, since the supporting member and the contacting surface supported, i.e., the bottom surface, usually are coplanar, the workpiece can be held securely in position which is necessary for milling.

However, by definition, a compound curve workpiece has no surface which remains in the same plane throughout the length of the workpiece. In common parlance, all of the surfaces "twist" from their original planes as they proceed through the length of the workpiece. Accordingly, since there is no flat surface which is always coplanar to the supporting member of the device which holds the workpiece for milling, existing devices are useless for compound curve workpieces.

The present invention solves this important technical problem with a method and apparatus for carrying out the method, which will now be described.

To understand the invention, attention is again directed to FIG. 1 wherein hold-down means 15 literally holds-down workpiece 20 in order to contain it for the milling process.

Block 21 functions to exert pressure on side 20X of workpiece 20 and presses the workpiece 20 against a guide 23 which is secured by bolts 24, 25, 25a which pass through slots 26, 27, 27a formed in shoe or sled 30. The slots provide means whereby the guide can be moved, upon loosening the bolts, to accommodate workpieces of different widths and also to accommodate different pitches and/or twists. (In this art, "pitch" means the rate the curve extends upwardly and "twist" means the degree the handrail rotates about its longitudinal axis.)

More particularly, the purpose of guide 23 is to present a planar surface against side 20V. If side 20V has one pitch or curve, the next workpiece may have a different pitch. To ensure that guide 23 is in flush contact with surface 20V of the next workpiece, the aforesaid bolts are loosened in their respective slots and guide 23 is bent or otherwise moved to conform to such ne pitch.

In turn, shoe or sled 30 is supported by risers 31, 32 above a shoe mounting plate 33.

Figure 3:
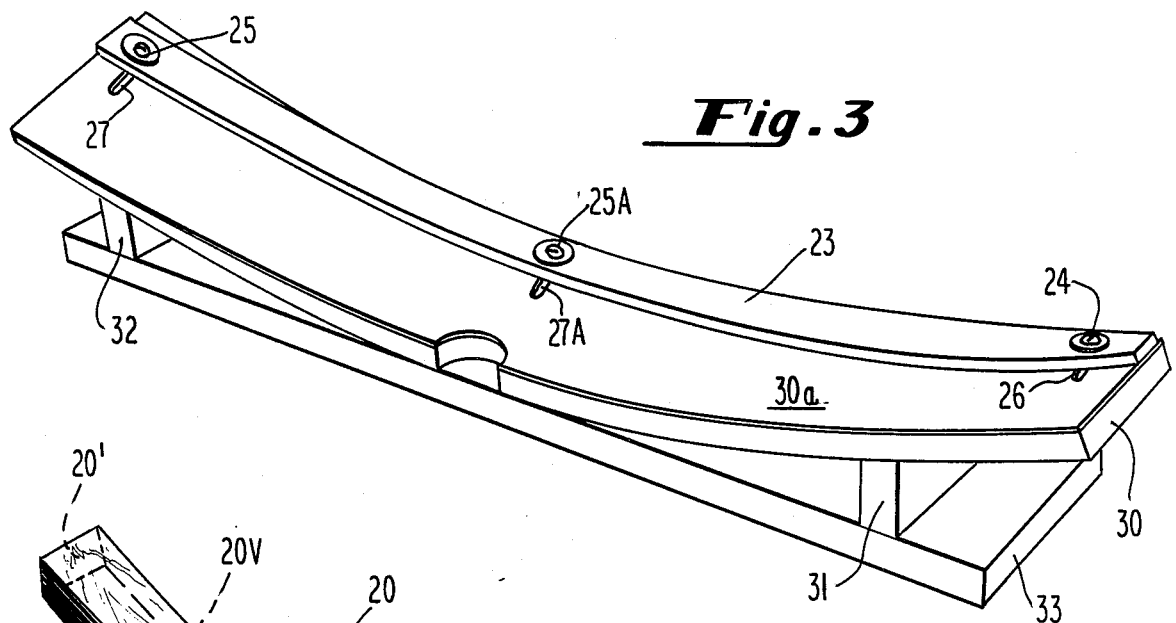
FIG. 3 is a perspective view of the shoe or sled which forms part of the apparatus shown in FIG. 1.

Shoe or sled 30 as shown in FIGS. 1 and 3 is configured in a compound curve in the same shape as the compound curve shape of the workpiece 20. In the example best shown in FIG. 2, workpiece 20 is a left-hand rail and thus shoe or sled 30 has the same left-hand compound curve shape. Accordingly, the upper surface 30a of shoe or sled 30 has the same contour as the lower surface 20B of workpiece 20. As a result, the shoe or sled 30 securely supports the workpiece 20 throughout the milling process, even as the workpiece 20 is moved along the shoe or sled 30 into engagement with the milling tool. As best shown in FIG. 5, the upper surface of shoe 30 may have a layer 30a of material attached to it for the purpose, e.g., of providing a layer which has a lower coefficient of friction than the basic shoe material 30, thereby to enhance the movement of the workpiece 20 over the shoe.

An important advantage of the invention is that a given shoe or sled 30 can be easily removed and another shoe or sled with a different compound curve shape inserted in place for use in connection with a correspondingly different workpiece, e.g., a right-hand handrail, or a different curve.

FIG. 4 shows the apparatus immediately adjacent to the shoe or sled 30 in more detail. Thus, hold down means 15 has an opening 15a which receives the bit 40 of a milling device, such as a router 41. A collet 41c holds bit 40.

As shown in FIG. 6 in schematic form, bit 41 has blades 41A and 41B which, when the high speed router 41 is turned on, rotate at very high RPMs, such as 10,000 to 20,000 RPM.

As shown, blades 41A 41B are in pressure contact with the surface 20X of workpiece 20 and are effective to mill down the jagged edges of surface 20X shown in FIG. 2A to produce a surface which is not only smooth, but, most importantly, parallel to opposing surface 20V and perpendicular to top and bottom surfaces 20T and 20B of the workpiece 20.

As shown in FIGS. 1, 4 and 5, the workpiece 20 is midway through the milling process. In actual operation, workpiece end 20, is fed into the feed-in end of the device, i.e., the end adjacent bolt 23 in FIG. 1, and moves along the shoe 30 in the direction of the arrows shown in FIGS. 1 and 5. This can be accomplished either manually or by controlled feeding means.

In any event, as workpiece 20 is placed on shoe or sled 30 and the side 20V is pressed against guide 23 and held against that guide by pressure on opposing side 20X exerted by the inward flexible surface 21a of in feed hold in means 21.

As workpiece 20 is moved to the location of bit 41, the bit cuts away the jagged edges of surface 20X and mills such surface to the smooth and parallel configuration desired. This occurs increment by increment, and workpiece 20 is moved forward only after the operator feels that the cutting process is finished for a given section (or, in the case of automatic controls, when the control sensor detects there is no more material to be removed).

As workpiece 20 moves closer to bit 41 guided by guide 23, the upper surface 20T of workpiece 20 is held down against shoe face 30a by hold down means 15.

Then, with the bit 41 turning, the workpiece 20 is carefully moved incrementally into contact with bit 41, the extra material is removed, and the process repeated until the entire surface 20X is rendered smooth and parallel as described. As workpiece 20 passes beyond bit 41, it is held against guide 23 by flexible means or fingers 21'a of block 21'.

After surface 20X is milled down, it is usually desirable to mill down the opposing surface 20V. To accomplish this, the workpiece 20 is fed with end 20'' fed in first onto the shoe or sled 30 and the foregoing procedure is repeated. That is, workpiece 20 is again placed on shoe 30 with end 20' fed into the device. Side 20X is pressured against guide 23 and held against it by pressure on side 20V exerted by 21a. As the workpiece 20 moves toward bit 41, the bit cuts away the jagged edges of surface 20V in the same incremental fashion described above until the entire surface 20X is smooth and parallel.

While the foregoing describes the methods and apparatus for milling a workpiece so that at least one surface has a smooth and planar surface, as indicated, by selecting other milling tools, such as router bits which are per se known in the art, it is possible to shape such surface in other desired ways, such as to form a groove therein, or a series of parallel groves, and many other shapes. Thus, for example, FIG. 6 shows a milling means 41 which has cutting means 41A' and 41B' which are, in vertical dimension, of less height than the height of workpiece 20. Specifically, in the example shown in FIG. 6, means 41A' and 41B' are between lamina 20T and 20B of workpiece 20, so that said means cut or otherwise mill or remove material from lamina 20C-20-L to create a groove. Such groove as shown has a planar side, but, by changing the blades of bit 41', it is possible to create other shapes, such as a groove with a curved cross-section.

I claim:

1. A method of milling a selected surface of a workpiece, said workpiece having the shape of a compound curve comprising the steps of:
   (a) forming a shoe in the shape of said compound curve to support the workpiece;
   (b) positioning the shoe adjacent a milling means;
   (c) moving the workpiece onto the shoe;
   (d) advancing the workpiece along the shoe toward the milling means; workpiece into contact with the milling means;
   (e) causing the milling means to mill said surface to a desired shaped;

(f) thereafter continuing to advance the surface of the workpiece into engagement with the milling means until said surface is milled by said means to a desired shaped.

2. The invention of claim 1 wherein the workpiece is a laminated wood handrail having top and bottom surfaces and opposing sides extending between said surfaces, and wherein after being formed into a compound curve shape, the individual lamina comprising the workpiece project unevenly from at least one side to create a rough surface, and wherein the said rough, uneven surface is advanced into engagement with said milling means to mill the projections and to produce a smooth, planar surface on said side.

3. A method of forming a compound curve article such as a handpiece comprising the steps of:
   (a) forming a workpiece to be formed into said article into the shape of a compound curve;
   (b) forming a support means having the same compound curve as that of the workpiece;
   (c) positioning said support means adjacent a cutting means;
   (d) advancing the workpiece along the support means so that the cutting means cuts the surface of the workpiece adjacent to it into a desired shape.

4. The invention of claim 3 wherein the desired shape is non-planar.

5. The invention of claim 3 wherein the desired shaped is smooth and planar.

6. Apparatus for milling one or more surfaces of a compound curve workpiece comprising:
   (a) a support means having the same compound curve shape as that of the workpiece, said support means being affixed to a supporting member;
   (b) a cutting means positioned adjacent to said support means;
   (c) means for guiding the workpiece along the support means so that a selected one of said surfaces is moved into engagement with said cutting means, whereby said cutting means cuts said surface to form it into a smooth and planar shape.

7. The invention of claim 6 wherein said desired shaped is smooth and planar.

8. The invention of claim 6 wherein the desired shape is non-planar.

9. A shoe for supporting a compound wood workpiece for use in a milling device wherein said workpiece is moved along said shoe into engagement with a milling tool, said shoe having substantially the same compound curve shape as the said workpiece.

10. The invention of claim 9 wherein guide means are affixed to said shoe.

11. The invention of claim 10 wherein said guide means are movable with respect to said shoe.

* * * * *